(12) United States Patent
Davies

(10) Patent No.: US 6,174,121 B1
(45) Date of Patent: Jan. 16, 2001

(54) DUST RETENTION SYSTEM

(75) Inventor: Brian T. Davies, Esperance (AU)

(73) Assignee: Brian Investments Pty Ltd, Esperance (AU)

(*) Notice: Under 35 U.S.C. 154(b), the term of this patent shall be extended for 0 days.

(21) Appl. No.: 09/404,476

(22) Filed: Sep. 24, 1999

(30) Foreign Application Priority Data

Sep. 24, 1998 (AU) .................................................. PP 6130

(51) Int. Cl.[7] .................................................. B65G 69/18
(52) U.S. Cl. .................................................. 414/291
(58) Field of Search .................................................. 414/291

(56) References Cited

U.S. PATENT DOCUMENTS

| | | | |
|---|---|---|---|
| 4,942,911 | * 7/1990 | Herbet | 414/291 X |
| 5,893,399 | * 4/1999 | Kearney | 414/291 X |

FOREIGN PATENT DOCUMENTS

| | | | |
|---|---|---|---|
| 0015651A | 9/1980 | (EP) . | |
| 0079485A | 5/1983 | (EP) . | |
| 2545071A | 11/1984 | (FR) . | |
| 2270683 | * 3/1994 | (GB) | 414/291 |
| 1191400A | 11/1985 | (SU) . | |
| 1191400 | * 11/1985 | (SU) | 414/291 |

* cited by examiner

Primary Examiner—Steven A. Bratlie

(57) ABSTRACT

A dust retention system for locating above a product vessel includes a support member mounted above the product vessel, a door including an engaging portion detachably connected to the support member and an adjustment device for adjusting the angle of the door with respect to the support member. The door includes a striking portion adjacent the engaging portion with at least a section of the striking portion being constructed of a resiliently flexible material. Product falling onto the striking portion causes the resiliently flexible material of the striking portion to be deflected by the weight of the product, thereby forcing the door from a closed position, where dust is prohibited from escaping the product vessel, into an open position where the product passes across the door into the product vessel. Thereafter the door, without the weight of said product, returning to the closed position under a bias force exerted by said resiliently flexible material.

11 Claims, 2 Drawing Sheets

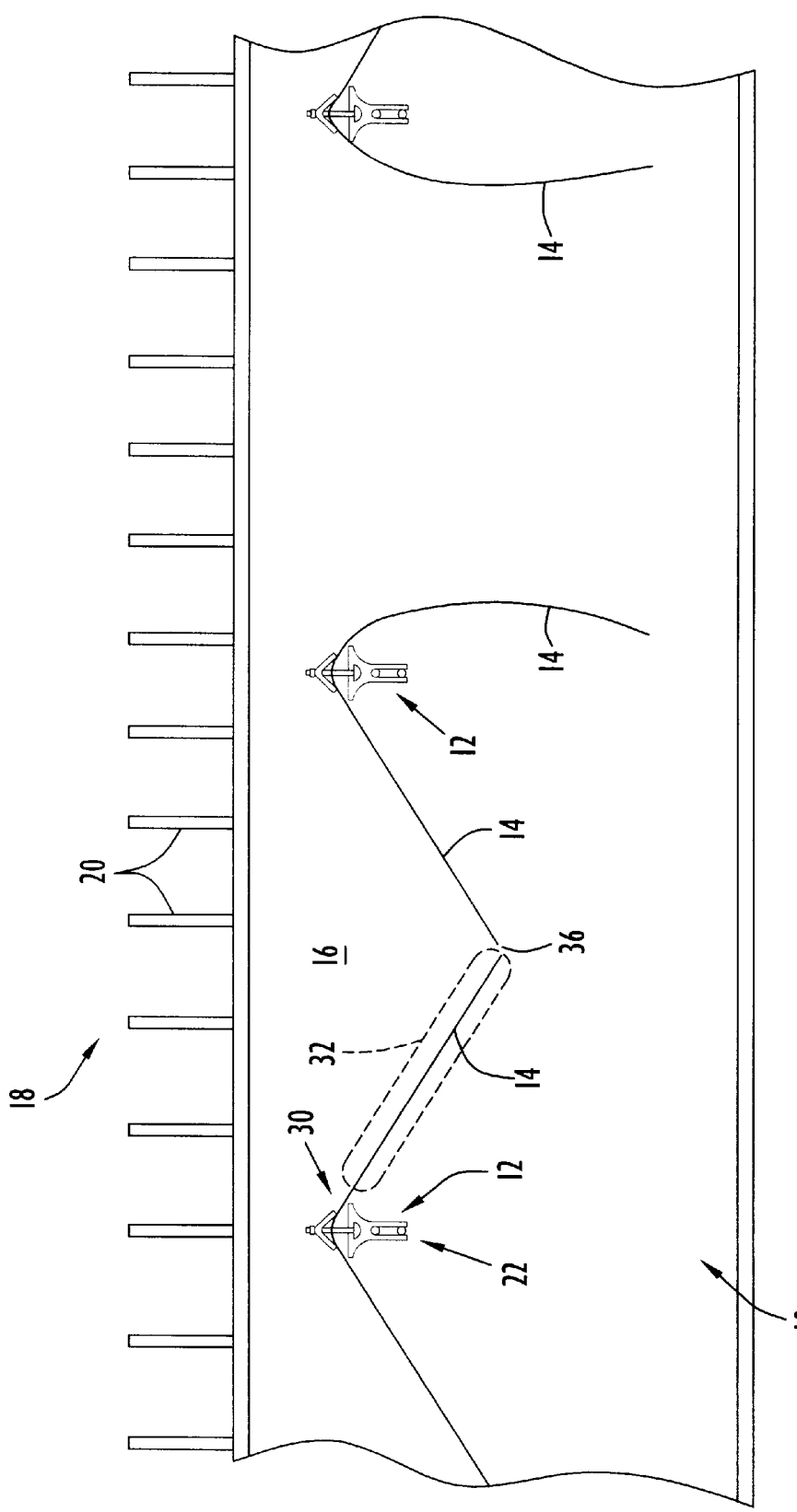

DUST RETENTION SYSTEM

FIELD OF THE INVENTION

The present invention relates generally to a door for installation in a dust retention system designed to be located above a product vessel.

BACKGROUND OF THE INVENTION

When dumping grain from a road train into a hopper a significant amount of dust is thrown up from the hopper the dust can "envelope" the road train and linger for some time. Mechanical dust retention systems have been designed to contain dust within the hopper so as to overcome or at least reduce this problem. A known dust retention system consists of a series of pressed steel doors hinged to a longitudinal beam which forms part of a grated floor structure through which the road train dumps the grain. Each of the steel doors is hinged at several points with a torsion spring acting on the door so as to urge it closed in an upward direction.

Although the known dust retention system is relatively inexpensive to manufacture it suffers from at least the following drawbacks:
  i) the hinged doors rely on moving parts for operation which require frequent maintenance or replacement;
  ii) the hinged doors are, with the sound of grain impacting on the solid steel surface, relatively noisy;
  iii) the doors are difficult to install demanding a relatively large amount of downtime;
  iv) the doors are subject to corrosion thereby requiring cleaning and frequent maintenance; and,
  v) the rate of flow of particulate material is unacceptably restricted.

Also, it is known to have flexible doors which flex under the weight of particulate material being dumped onto the flexible doors. It is difficult to correctly position the flexible doors for use at a desired angle to the floor structure. In addition the flexible doors often need adjustment or maintenance. There is therefore a need for a means of adjusting the flexible doors that also accommodates maintenance of the dust retention system.

SUMMARY OF THE INVENTION

An object of the present invention is to provide a dust retention system which provides for easy adjustment of a door in the dust retention system.

According to the present invention there is provided a dust retention system for location above a product vessel, said system comprising:
  a support member adapted to be mounted above the product vessel; and,
  a door including an engaging portion detachably mounted on the support member and retained in place by an adjustment means for adjusting the door to a desired angle with respect to the support member, the door also including a striking portion adjacent the engaging portion with at least a section of the striking portion being constructed of a resiliently flexible material;
  whereby, in use, product falling onto the striking portion causes the resiliently flexible material of the striking portion to be deflected by the weight of said product thereby forcing the door from a closed position, where dust is inhibited from escaping the product vessel, into an open position where the product passes across the door and into the product vessel, and thereafter the door, without the weight of said product, returning to the closed position under a bias force exerted by said resiliently flexible material. Preferably, the door is detachably mounted substantially above the support member.

Preferably, the adjustment means includes a retainer for retaining the door on the support member and for retaining the door at said desired angle to the support member. Preferably the retainer cooperates with the support member to apply oppositely directed forces on the door in order to maintain the door at said desired angle.

Typically, the retainer applies a downward force to the door and the support member applies an upward force to the door, wherein the upward force is applied to a point of the engaging portion closer to the striking portion, than a point of the engaging portion where the downward force is applied. The support member acts as a fulcrum balancing the weight of the striking portion against the downward force applied by the retainer. Typically, the retainer is an elongate member, having a V-shaped cross section.

Preferably, the adjustment means further includes one or more adjustable fasteners that fasten the retainer and the engaging portion to the support member. Typically, each fastener is a bolt secured with a nut.

Preferably, the support member includes a flange for the engaging portion of the door to sit on, wherein the flange applies an upward force to the door, More preferably, the downward force is applied to the door by the tip of the V-shaped member.

Typically, the door is generally oblong shaped with the engaging portion formed along a longitudinal edge thereof. More typically, two doors are formed integrally with one another to form a double door member, wherein the two doors are joined along a longitudinal edge.

Preferably, the flange on the support member is one of a pair of opposed flanges, each one acting as the flange for each door of the double door member.

Preferably, each adjustable fastener extends from the support member upwardly through a hole in the engaging portion of the doors of the double door member and through a hole in the retainer to sandwich the engaging portion between the retainer and the support member.

Preferably, the engaging and striking portions of the door are formed integral with each other. More preferably, the striking portion is constructed entirely from the resiliently flexible material.

Typically, the resiliently flexible material is a metallic material. More typically, said material is stainless steel spring sheeting. In one embodiment the stainless steel spring sheeting is Grade 304.

Typically, the striking portion of the door is constructed of a sheet material of substantially constant thickness. In one embodiment, the sheet material is less than approximately 1 mm in thickness.

Typically, the support member is a rail. More typically, the rail includes a longitudinal groove designed to releasably engage the fastener of the adjustment means so as to detachably connect the doors and adjustment means to the rail. Preferably, the groove includes a keyway formed continuous with the longitudinal groove and has a shape that is complementary to a head of the fastener. Preferably, the longitudinal groove is positioned between the two opposed flanges.

Preferably, each of the doors of the double door member extend from the support member at an angle of between approximately 20° to 40° relative to a horizontal plane. Advantageously, this allows for a relatively free flow of the product under the influence of gravity across the doors and into the product vessel. Preferably, the angle of the V-shaped member is less than an angle between the doors of the double door member.

Typically, opposing ends of the support member are configured to detachably mount to opposing beams disposed above the product vessel. More typically, opposing ends of the support member each include a recess shaped to removably locate each end of the support member upon a corresponding lug of each of the opposing beams.

Typically, the support member and the doors of the double door member form a double door row that is one of a series of form a double door row that detachably mounted between and disposed transverse to a pair of opposing beams so that a space defined between said opposing beams is substantially sealed to inhibit the escape of dust from the product vessel. More typically, the series of double door rows are arranged so that with said doors in a closed position, a relatively small gap exists between the opposite edges of the doors facing each other. The relatively small gap allows any product resting on the door adjacent said opposite edge to fall into the product vessel so as to avoid contamination of product in said vessel.

Typically, the product vessel is a hopper or a silo. In one example, the product is grain where dust problems are particularly prevalent when loading a hopper or silo. Alternatively, the product is sugar, coal, sands, woodchips, or practically any other product where dust control during loading/unloading is beneficial.

BRIEF DESCRIPTION OF THE DRAWINGS

In order to achieve a better understanding of the nature of the present invention a possible embodiment of a door for installation in a dust retention system and a dust retention system will now be described in some detail, by way of example only, with reference to the accompanying drawings in which:

FIG. 1 is a sectional view of a dust retention system located beneath a grated floor structure above a hopper;

DETAILED DESCRIPTION OF PREFERRED EMBODIMENT

Figure 4:
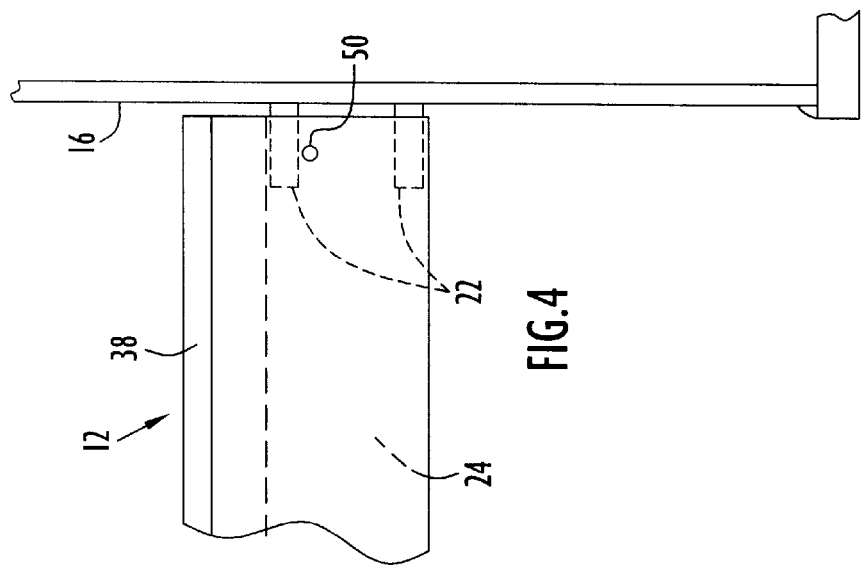
FIG. 4 is a sectional view of the cross-section B—B of FIG. 2.

As shown in FIG. 1, there is a dust retention system shown generally as 10 comprising a series of support members or rails 12 and doors 14. Although not illustrated in FIG. 1, the doors 14 are each generally oblong-shaped. A pair of doors 14 are arranged to integrally form an inverted V-shaped double door.

The rails 12 are mounted between longitudinal I-section beams 16 of a grated floor structure 18. A series of transverse grating bars 20 are welded across an upper surface of the longitudinal I-section beams 16. The grated floor structure 18 is designed so that a road train or the like (not shown) can drive over the transverse bars 20 and dump its load which may include grain, sugar, coal, sands, wood chips or any other product. The product passes through the grated floor structure 18 into one or more product vessels or hoppers (not shown) located beneath the floor structure 18.

In this embodiment, a series of two support pins 22 are welded to opposing faces of the I-section beams 16 so that each of the rails 12 can removably mount between the longitudinal beams 16.

Figure 2:
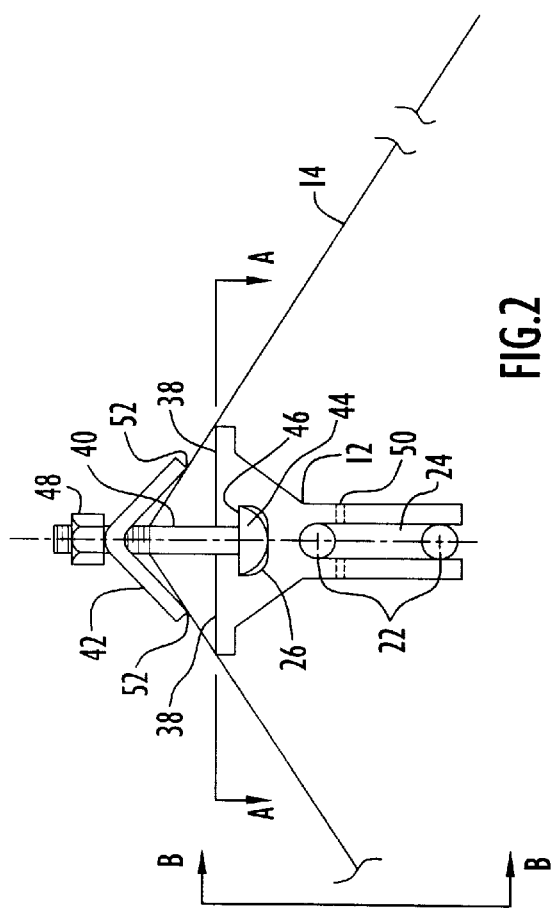
FIG. 2 is an end and side elevational view of a support member is taken from FIG. 1.

As depicted in FIG. 2, each of the rails 12 has a recess 24 formed in a bottom portion thereof. The recess 24 is substantially rectangular in cross-section in a shape complementary to each pair of the pins 22, whereby each of the rails 12 can located upon the pins 22. The rail 12 also includes a longitudinal groove 26 formed on an upper surface of the rail 12. The longitudinal groove 26 is disposed between a pair of opposed flanges 38 which extend outwardly from the centre of the rail 12 so as to together define a substantially horizontal plane.

The rails 12 of this embodiment are constructed of an extrudable aluminium alloy material. However, it will be appreciated that other materials such as a plastics material of suitable strength may be used.

As shown in greater detail in FIG. 2, the angle of each door 14 in relation to the rail 12 is adjustable by means of a retainer 42 in the form of a V-shaped member positioned in an inverted manner on the pair of doors 14. A fastener in the form of a bolt 40 and a nut 48 sandwiches the doors between the V-shaped member 42 and the rail 12. Extreme ends (or tips) 52 of the V-shaped member exert a downward force on the doors 14, while the ends of flanges 38 exert an upward force on the doors 14. The ends of the flanges are wider apart from one another than the ends 52. The combination of upward and downward forces acts to hold the door 14 at a desired angle relative to the rail 12. More specifically, the upward force of the end of the flange is caused by it acting as a fulcrum. It balances a downward force applied by the weight of a striking portion 32 of door 14 against the downward force applied by the tip 52 of the V-shaped member.

As depicted in FIG. 1, each of the doors 14 includes an engaging portion 30 formed continuously with a striking portion 32 (encircled in broken lines). The engaging portions 30 of the double door are configured to detachably connect to one of the rails 12 via one or more fasteners 40 which pass through a respective hole in the join between each door 14 of the double door. The retainer 42 then sits on the engaging portions 30 of the doors.

The striking portion 32, as the terminology suggests, is designed to be "struck" by any product falling through the grated floor structure 18 into a hopper located thereunder.

The striking portion 32 of each door 14 is constructed of a sheet material of substantially constant thickness. Although not illustrated, an opposite longitudinal edge of the door 14 may be beaded. Particularly when the doors 14 are extruded from a plastics material, the beaded edge forms a relatively straight and stiff edge.

Each door 14 is constructed of a resiliently flexible material such as a metallic or alternatively a plastics material. In one embodiment, the doors 14 are constructed of Grade 304 stainless steel spring sheeting having a thickness of approximately 0.6 mm.

The longitudinal groove 26 in the rail 12 includes a key-way 46 formed continuously along the length of the longitudinal groove 26 and of a complementary shape to a head 44 of the bolt 40.

The rail 12 includes a hole 50 extending through bottom portion of the rail 12 and the recess 24 so that a clip may be inserted into the hole 50 so as to secure the rail 12 to one of the pins 22.

In order to facilitate a further understanding of the present invention operation of the dust retention system described above will now be explained.

Figure 3:
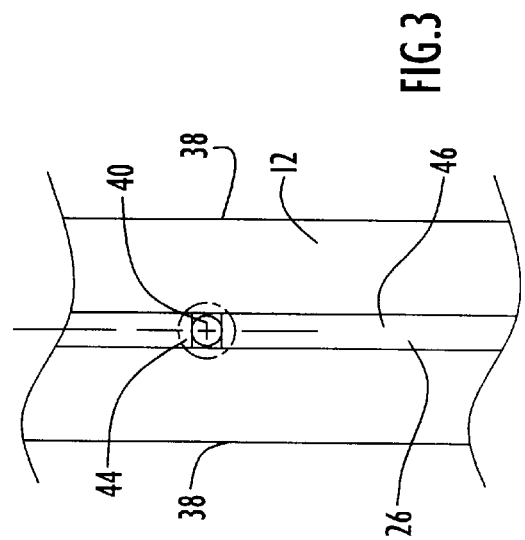
FIG. 3 is a sectional view of the cross-section A—A of FIG. 2.

To assemble the dust retention system 10, bolts 40 are slid into the longitudinal groove 26, SO that the head of the bolt 44 is within the keyed recess 46, as seen in FIG. 3. The bolts 40 are spaced apart at a distance so as to align with holes in the double doors. The rails 12 are positioned on the pairs of pins 22 so that the recess 24 sits on opposed pairs of pins 22 within the grated floor structure 18 as seen in FIG. 4. A clip is inserted into the hole 50 to secure the rails in position.

The double door members are placed on top of the rails 12 so that the bolts 40 extend upwardly from the rails 12 passes through the corresponding holes in the double doors. The V-shaped member 42 is positioned on top of the double doors in an inverted manner so that the upwardly projecting bolt 40 passes through corresponding holes in the V-shaped member. The tips of the V rest on the doors 14.

The nuts 48 are secured to each corresponding bolt 40 and then tightened so as to move the position of the tips 52 of the V-shaped member closer to the rail 12 thereby sandwiching the engaging portion thus altering the angle of the doors 14 in relation to the rail 12. This will flatten the doors or reduce their angle to the horizontal and decrease the angle to each other. Equally, the bolts may be loosened to decrease the sandwiching force applied and increasing the distance of the tips 52 from the rail 12, which will cause them to droop or increase the angle of the doors 14 to the horizontal and decrease the angle to each other.

The pairs of pins 22 are spaced so that with the doors 14 in a closed position there is a slight gap 36 between opposing beaded edges of the doors 14. The gap 36 allows excess product retained on the door 14 to pass therethrough. This ensures that when a different product is dumped through the grated floor structure 18 the product within the hopper is not contaminated.

FIG. 1 illustrates an opposing pair of doors 14 in both the closed position and an open position (on a left and right hand side of FIG. 1, respectively). Product being dumped through the floor structure 18 falls onto the striking portion 32 of the doors 14 forcing said doors 14 from the closed position into the opened position. In the closed position dust is inhibited from escaping the hopper located beneath the floor structure 18. In the opened position the resiliently flexible doors 14 are deflected by the weight of the product so that the product passes across the doors 14 and into the product hopper. Once the weight of product comes off the doors 14 they return to the closed position under a bias force exerted by the resiliently flexible material from which the doors 14 are constructed. Thus, the doors 14 automatically open upon dumping of a product and close once dumping of the product has stopped.

Now that a possible embodiment of the present invention has been described in some detail it will be apparent to those skilled in the art that the dust retention system has at least the following advantages over the admitted prior art:
  (i) due to the system including resiliently flexible doors there are no moving parts and thus little maintenance is required;
  (ii) the system, being modular in construction, can be repaired/maintained with relatively quick door and/or rail replacement;
  (iii) the system is relatively quiet when in operation, the only noise resulting from product brushing over the rails and doors;
  (iv) the system is relatively effective in preventing the egress of dust wherein the doors automatically return to a closed position relatively quickly once the dumping of product stops;
  (v) the doors and/or rails are suited to non-corrosive materials thereby requiring minimum maintenance;
  (vi) the angle of the doors in relation to the rails is adjustable; and,
  (vii) the flow of particulate material is not significantly impeded by the doors and supporting rails, in fact the restriction is less than 15%, compared to a restriction rate of about 60% of the device of EP 0,015,651.

Those skilled in the art will appreciate that the invention described herein is susceptible to variations and modifications other than those specifically described. For example, the door may be connected to the supporting member by bolting or fixing in another manner. Further, the door may not be constructed entirely from the resiliently flexible material but rather include a web of said material that allows the door to resiliently deflect about the support member. The adjusting means may be of a different configuration such that the protrusions of the rail sit on top of the doors and an adjustable support member extends outwardly from the rail and supports the doors.

All such variations and modifications are to be considered within the scope of the present invention, the nature of which is to be determined from the foregoing description and the appended claims.

The claims defining the invention are as follows:

1. A dust retention system for location above a product vessel, said system comprising:
  a support member adapted to be mounted above the product vessel;
  a door including an engaging portion detachably mounted on the support member, the door also including a striking portion adjacent the engaging portion with at least a section of the striking portion being constructed of a resiliently flexible material; and
  an adjustment means for retaining the door in place on the support member and adjusting the desired angle of the door with respect to the support member,
  such that product falling onto the string portion causes the resiliently flexible material of the striking portion to be deflected by the weight of said product while the engaging portion is retained in place over the support member thereby forcing the door from a closed position, where dust is inhibited from escaping the product vessel, into an open position, where the product passes across the door and into the product vessel, and thereafter the door, without the weight of said product, returns to the closed position under a bias force exerted by said resiliently flexible material.

2. A dust retention system according to claim 1, wherein the adjustment means includes a retainer that retains the door on the support member and at said desired angle to the support member.

3. A dust retention system according to claim 2, wherein the retainer cooperates with the support member to apply oppositely directed forces on the door in order to maintain the door at said desired angle.

4. A dust retention system according to claim 3, wherein the retainer has a V-shaped cross section with a tip that contacts the door, the support member includes a flange on which the engaging portion of the door sits and the flange acts as a fulcrum that balances the weight of the striking portion of the door against a downward force applied to the engaging portion of the door by the tip of the retainer.

5. A dust retention system according to claim 4, wherein two doors are formed integrally with one another to form a double door member, and the two doors are joined along a longitudinal edge of their engaging portions to form an integral engaging portion.

6. A dust retention system according to claim 5, wherein the adjustment means further includes one or more adjustable fasteners that fasten the retainer and the integral engaging portion to the support member, and the position of the tip is adjusted by adjusting the fastener.

7. A dust retention system according to claim 6, wherein each adjustable fastener extends from the support member upwardly through a hole in the intergral engaging portion of the double door member and through a hole in the retainer to sandwich the intergral engaging portion between the retainer and the support member.

8. A dust retention system according to claim 6, wherein the support member is a rail that includes a longitudinal groove between the two flanges that releasably engages the fastener of the adjustment means so as to detachably connect the doors and adjustment means to the rail.

9. A dust retention system according to claim 8, wherein the groove includes a keyway formed continuous with the longitudinal groove, the keyway having a shape which is complementary to a head of the fastener.

10. A dust retention system according to claim 1, wherein the striking portion of the door is constructed of stainless steel sheet material of substantially constant thickness.

11. A dust retention system according to claim 7, wherein the support member and the doors of the double door member form a double door row that is one of a series of double door rows that are detachably mounted between and disposed transverse relative to a pair of opposing beams so that a space defined between each beam in said pair of beams is essentially sealed to inhibit the escape of dust from the product vessel.

* * * * *